US012746475B2

(12) United States Patent
Kurabayashi

(10) Patent No.: US 12,746,475 B2
(45) Date of Patent: Sep. 29, 2026

(54) METHOD, ETC. FOR GENERATING TRAINED MODEL FOR PREDICTING ACTION TO BE SELECTED BY USER

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 381 days.

(21) Appl. No.: 18/488,469

(22) Filed: Oct. 17, 2023

(65) Prior Publication Data

US 2024/0058704 A1 Feb. 22, 2024

Related U.S. Application Data

(63) Continuation of application No. PCT/JP2022/018034, filed on Apr. 18, 2022.

(30) Foreign Application Priority Data

Apr. 19, 2021 (JP) ................................ 2021-070092

(51) Int. Cl.
*A63F 13/67* (2014.01)
*A63F 13/798* (2014.01)
*G06F 40/40* (2020.01)

(52) U.S. Cl.
CPC ............ *A63F 13/67* (2014.09); *A63F 13/798* (2014.09); *G06F 40/40* (2020.01)

(58) Field of Classification Search
CPC .. A63F 13/67; A63F 13/798; A63F 2300/206; G06F 40/40; G06N 20/00
See application file for complete search history.

(56) References Cited

U.S. PATENT DOCUMENTS 7,340,370 B2 * 3/2008 Kawaguchi .......... G01D 5/2046 340/672
7,458,889 B2 * 12/2008 Gauselmann ....... G07F 17/3258 463/16

(Continued)

FOREIGN PATENT DOCUMENTS

JP 6438612 B1 12/2018

OTHER PUBLICATIONS

International Search Report issued in PCT/JP2022/018034 on Jun. 14, 2022 (5 pages).

(Continued)

*Primary Examiner* — Seng H Lim
(74) *Attorney, Agent, or Firm* — Osha Bergman Watanabe & Burton LLP

(57) ABSTRACT

One or more embodiments of the invention is a method for generating a trained model for predicting an action to be selected by a user in a game that proceeds in accordance with actions selected by the user, while updating game states, the method including: determining weights for individual history-data element groups; generating training data from data of game states and actions included in the history-data element groups; and generating a trained model on the basis of the generated training data, wherein the generation of training data includes generating a number of items of game state text as game state text corresponding to one game state, having different orders of a plurality of text elements, the number being based on the determined weight, and generating training data including pairs of the individual generated items of game state text and corresponding action text.

7 Claims, 5 Drawing Sheets

(56) References Cited

U.S. PATENT DOCUMENTS

| | | | | |
|---|---|---|---|---|
| 10,888,788 | B2 * | 1/2021 | Osman | A63F 13/422 |
| 11,042,784 | B2 * | 6/2021 | Jelveh | G06V 10/7784 |
| 11,645,947 | B1 * | 5/2023 | Blair | G10L 15/18<br>704/275 |
| 11,790,181 | B2 * | 10/2023 | Guo | G06F 40/35<br>704/9 |
| 2019/0087691 | A1 * | 3/2019 | Jelveh | G06N 3/084 |
| 2020/0289943 | A1 * | 9/2020 | Rico | A63F 13/798 |
| 2020/0298102 | A1 * | 9/2020 | Varrasso | A63F 13/792 |
| 2021/0001231 | A1 * | 1/2021 | Kurabayashi | G06F 11/36 |
| 2021/0295099 | A1 * | 9/2021 | Huang | A63F 13/56 |
| 2022/0058345 | A1 * | 2/2022 | Guo | G06F 40/253 |
| 2023/0330526 | A1 * | 10/2023 | Kipnis | A63F 13/42 |
| 2023/0356089 | A1 * | 11/2023 | Kurabayashi | A63F 13/79 |
| 2024/0382855 | A1 * | 11/2024 | Osman | A63F 13/45 |

OTHER PUBLICATIONS

Written Opinion of the International Searching Authority issued in PCT/JP2022/018034 on Jun. 14, 2022 (3 pages).

Jacob Devlin et al., "BERT: Pre-training of Deep Bidirectional Transformers for Language Understanding," arXiv:1810.04805, 2018 (16 pages).

Ashish Vaswani et al.; "Attention is all you need"; In Proceedings of the 31st International Conference on Neural Information Processing Systems (NIPS'17); 2017; Curran Associates Inc.; Red Hook, NY, USA; pp. 6000-6010 (3 pages).

* cited by examiner

METHOD, ETC. FOR GENERATING TRAINED MODEL FOR PREDICTING ACTION TO BE SELECTED BY USER

TECHNICAL FIELD

The present invention relates to a method for generating a trained model for predicting an action to be selected by a user, a method for determining an action that is predicted to be selected by a user, etc.

BACKGROUND ART

Recently, an increasing number of players are enjoying online games in which a plurality of players can participate via a network. Such a game is realized, for example, by a game system in which mobile terminal devices carry out communication with a server device of a game service provider, and players who operate the mobile terminal devices can play battles with other players.

Online games include games that proceed in accordance with actions selected by users, while updating game state information representing the game state. Examples of such games include card games called digital collectible card games (DCCGs), in which various actions are executed in accordance with combinations of game media such as cards or characters.

CITATION LIST

Patent Literature

[PTL 1]
Publication of Japanese Patent No. 6438612

Non-Patent Literature

[NPL 1]
Jacob Devlin and Ming-Wei Chang and Kenton Lee and Kristina Toutanova, "BERT: Pre-training of Deep Bidirectional Transformers for Language Understanding," arXiv:1810.04805, 2018

[NPL 2]
Ashish Vaswani, Noam Shazeer, Niki Parmar, Jakob Uszkoreit, Llion Jones, Aidan N. Gomez, Lukasz Kaiser, and Illia Polosukhin. 2017. Attention is all you need. In Proceedings of the 31st International Conference on Neural Information Processing Systems (NIPS'17). Curran Associates Inc., Red Hook, NY, USA, 6000-6010

SUMMARY OF INVENTION

Technical Problem

With online games, it is desired to realize AI that utilizes game history data (replay logs) as data for machine learning and that predicts actions to be selected (executed) by humans in given game states to reproduce human-like behavior. For example, Patent Literature 1 discloses a technology for inferring an action that is more likely to be executed by a user. Meanwhile, neural network technology that makes it possible to recognize context, called transformer (transformer neural network technology) (Non-Patent Literatures 1 and 2), is effective in the case of learning causal relationships or order relationships as in turn-based battle games, but it has been difficult to use this type of technology for the purpose of learning game history data.

The present invention has been made in order to solve the problem described above, and it is an object thereof to provide a method, etc. that make it possible to generate a trained model for predicting an action to be selected by a user in a given game state by using neural network technology with which natural language processing is possible.

Solution to Problem

A method according to an embodiment of the present invention is a method for generating a trained model for predicting an action to be selected by a user in a game that proceeds in accordance with actions selected by the user, while updating game states, the method including:

a step of determining weights for individual history-data element groups included in history data concerning the game, on the basis of user information associated with the individual history-data element groups;

a step of generating game state text and action text, which are text data expressed in a prescribed format, from data of game states and actions included in the history-data element groups included in the history data, and generating training data including pairs of game state text and action text corresponding to pairs of one game state and an action selected in the one game state; and a step of generating a trained model on the basis of the generated training data, wherein the step of generating training data includes generating a number of items of game state text as game state text corresponding to one game state, including items of game state text having different orders of a plurality of text elements included in the game state text, the number being based on the weight determined for the history-data element group including data of the one game state, and of generating training data including pairs of the individual generated items of game state text and action text corresponding to an action selected in the one game state.

Furthermore, in an embodiment of the present invention, in the step of generating a trained model, a trained model is generated by training a deep learning model with the generated training data, the deep learning model being directed to learning sequential data.

Furthermore, in an embodiment of the present invention, in the step of determining weights, weights are determined so as to have magnitudes corresponding to the levels of user ranks included in the user information.

Furthermore, in one embodiment of the present invention, the step of generating a trained model includes generating a trained model by training a pretrained natural language model with the generated training data, the pretrained natural language model having learned in advance grammatical structures and text-to-text relationships concerning a natural language.

Furthermore, in an embodiment of the present invention, the step of generating training data includes generating training data including first pairs and second pairs, the first pairs being pairs of game state text and action text corresponding to pairs of one game state and an action selected in the one game state, generated on the basis of data of game states and actions included in the history-data element groups included in the history data, and the second pairs being pairs of the one game state text and action text corresponding to actions that are randomly selected from actions selectable by a user and that are not included in the first pairs; and the step of generating a trained model includes generating a trained model by performing training with the first pairs as correct data and performing training with the second pairs as incorrect data.

Furthermore, a program according to an embodiment of the present invention causes a computer to execute the steps of the method described above.

Furthermore, a system according to an embodiment of the present invention is a system for generating a trained model for predicting an action to be selected by a user in a game that proceeds in accordance with actions selected by the user, while updating game states, the system:

determining weights for individual history-data element groups included in history data concerning the game, on the basis of user information associated with the individual history-data element groups;

generating game state text and action text, which are text data expressed in a prescribed format, from data of game states and actions included in the history-data element groups included in the history data, and generating training data including pairs of game state text and action text corresponding to pairs of one game state and an action selected in the one game state; and generating a trained model on the basis of the generated training data, wherein the generation of training data includes generating a number of items of game state text as game state text corresponding to one game state, including items of game state text having different orders of a plurality of text elements included in the game state text, the number being based on the weight determined for the history-data element group including data of the one game state, and of generating training data including pairs of the individual generated items of game state text and action text corresponding to an action selected in the one game state.

Advantageous Effects of Invention

The present invention makes it possible to generate a trained model for predicting an action to be selected by a user in a given game state by using neural network technology with which natural language processing is possible.

DESCRIPTION OF EMBODIMENTS

Figure 1:
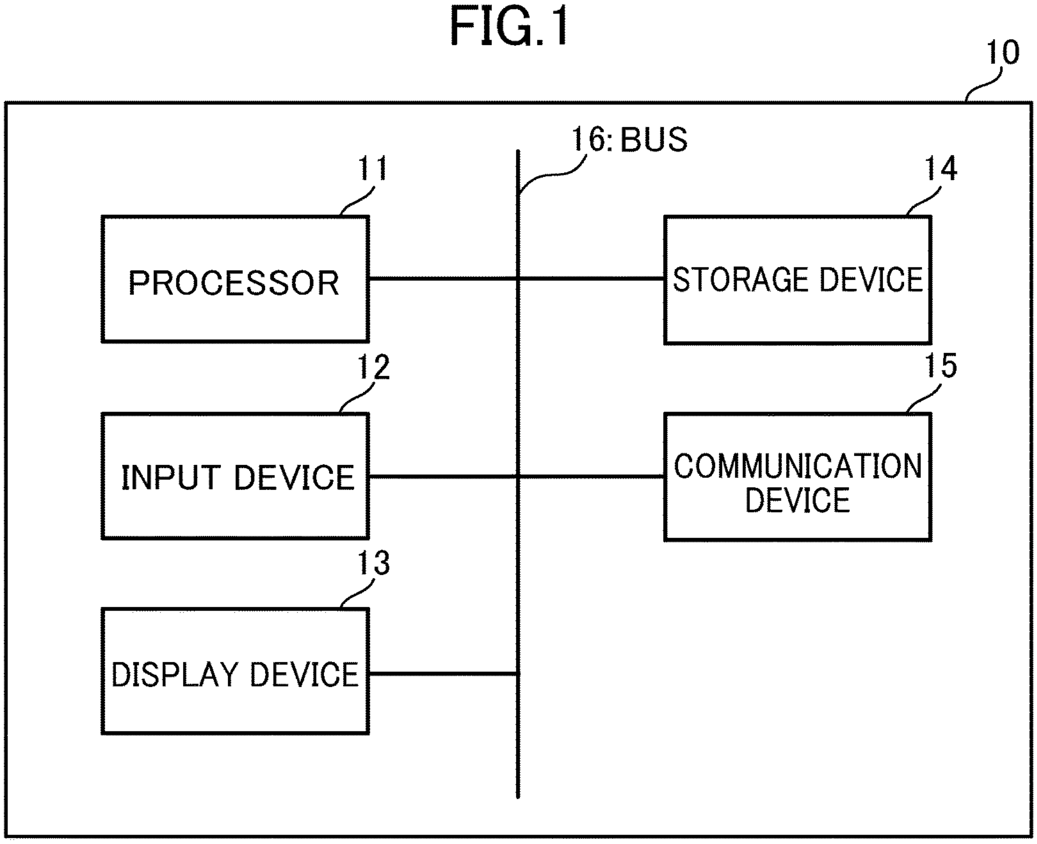
FIG. 1 is a block diagram showing the hardware configuration of a learning device in one embodiment of the present invention.

An embodiment of the present invention will be described below with reference to the drawings. A learning device 10 in one embodiment of the present invention is a device for generating a trained model for predicting an action to be selected by a user (player) in a game that proceeds in accordance with actions selected by the user, while updating game states. A determining device 50 in one embodiment of the present invention is a device for determining actions that are predicted to be selected by users in a game that proceeds in accordance with actions selected by the users, while updating game states. For example, the abovementioned game to which the learning device 10 and the determining device 50 are directed is a game in which when a user selects an action in a certain game state, the selected action (an attack, an event, or the like) is executed, and the game state is updated, like a battle-type card game.

The learning device 10 is an example of a system for generating a trained model, configured to include one or more devices. For convenience of description, however, the learning device 10 will be described as a single device in the following embodiment. A system for generating a trained model may also mean the learning device 10. The same applies to the determining device 50. Note that, in this embodiment, determining a game state or an action may mean determining data of a game state or data of an action.

The battle-type card game that is described in the context of this embodiment (the game in this embodiment) is provided by a game server configured to include one or more server devices, similarly to online games in general. The game server stores a game program, which is an application for the game, and is connected via a network to terminal devices of individual users who play the game. While each user is executing the game app installed in the terminal device, the terminal device carries out communication with the game server, and the game server provides a game service via the network. At this time, the game server stores history data (log data such as replay logs) concerning the game. The history data includes a plurality of history-data element groups (e.g., replay-log element groups), and each history-data element group includes a plurality of history-data elements (e.g., log elements). For example, each history-data element group represents the history of a single battle and includes a plurality of history data elements concerning the battle. Alternatively, each history-data element group may be configured to include a plurality of history data elements relating to a prescribed event or a prescribed time other than a single battle. Furthermore, for example, each log element is data representing an action executed by a user in one game state or data representing the one game state.

However, the configuration of the game server is not limited to the above configuration as long as it is possible to acquire replay logs (log data).

The game in this embodiment proceeds while a user selects cards from a possessed card group constructed to include a plurality of cards and places those cards in a game field 43, whereby various events are executed in accordance with combinations of the cards or classes. Furthermore, the game in this embodiment is a battle game in which a local user and another user battle against each other by each selecting cards from the possessed card group and placing those cards in the game field 43, where the local user refers to the user himself or herself who operates a user terminal device, and the other user refers to a user who operates another user terminal device. In the game in this embodiment, each card 41 has card definition information including a card ID, the kind of card, and parameters such as hit points, attacking power, and an attribute, and each class has class definition information.

Figure 3:
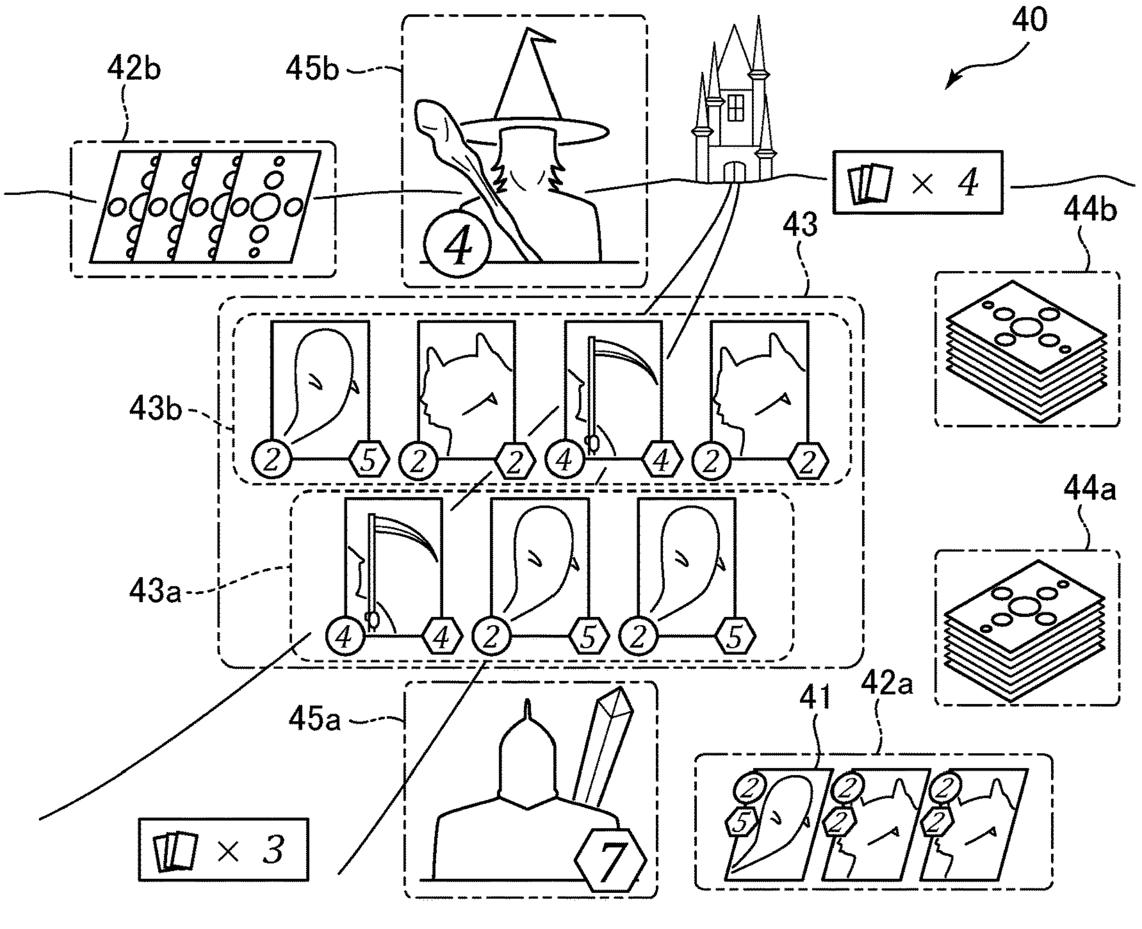
FIG. 3 shows an example game screen in a game in this embodiment, which is displayed on a display of a terminal device of a user.

FIG. 3 shows an example game screen of the game in this embodiment, which is displayed on the display of the terminal device of a user. The game screen shows a game screen 40 for a card battle between a local user and another user. The game screen 40 shows a first card group 42*a*, which is the hand of the local user, and a first card group 42*b*, which is the hand of the other user. The first card group 42*a* and the first card group 42*b* include cards 41 associated with characters, items, or spells. The game is configured so that the local user cannot recognize the cards 41 in the first card group 42*b* of the other user. The game screen also shows a second card group 44*a*, which is the stock of the local user, and a second card group 44*b*, which is the stock of the other user. Note that for the local user or the other user, operations may be performed by a computer, such as a game AI, instead of the real player.

The possessed card group possessed by each user is constituted of a first card group 42 (42*a* or 42*b*), which is the hand of the user, and a second card group 44 (44*a* or 44*b*), which is the stock of the user, and is generally referred to as a card deck. Whether each card 41 possessed by the user is included in the first card group 42 or the second card group 44 is determined in accordance with the proceeding of the game. The first card group 42 is a group of cards that can be selected and placed in the game field 43 by the user, and the second card group 44 is a group of cards that cannot be selected by the user. Although the possessed card group is constituted of a plurality of cards 41, depending on the proceeding of the game, there are cases where the possessed card group is constituted of a single card 41. Note that the card deck of each user may be constituted of cards 41 of all different kinds, or may be constituted to include some cards 41 of the same kind. Furthermore, the kinds of cards 41 constituting the card deck of the local user may be different from the kinds of cards 41 constituting the card deck of the other user. Furthermore, the possessed card group possessed by each user may be constituted of only the first card group 42.

The game screen 40 shows a character 45*a* selected by the local user and a character 45*b* selected by the other user. The character that is selected by a user is different from characters associated with cards, and defines a class indicating the type of the possessed card group. The game in this embodiment is configured such that the cards 41 possessed by users vary depending on classes. In one example, the game in this embodiment is configured such that the kinds of cards that may constitute the card decks of individual users vary depending on classes. Alternatively, however, classes need not be included in the game in this embodiment. In this case, the game in this embodiment may be configured such that class-based limitations such as the above are not dictated and such that the game screen 40 does not display the character 45*a* selected by the local user or the character 45*b* selected by the other user.

The game in this embodiment is a battle game in which a single battle (card battle) includes a plurality of turns. In one example, the game in this embodiment is configured such that, in each turn, the local user or the other user, by performing an operation such as selecting one of his or her own cards 41, can attack one of the cards 41 or the character 45 of the opponent or can generate a prescribed effect or event by using one of his or her own cards 41. In one example, the game in this embodiment is configured such that, for example, in the case where the local user selects one of the cards 41 and performs an attack, the local user can select one of the cards 41 or the character 45 of the opponent as the target of the attack. In one example, the game in this embodiment is configured such that when the local user selects one of the cards 41 and performs an attack, the target of the attack is automatically selected depending on that card. In one example, the game in this embodiment is configured such that in response to a user operation on one of the cards or characters on the game screen 40, a parameter of another card or character, such as the hit points or the attacking power, is changed. In one example, the game in this embodiment is configured such that in the case where a game state satisfies a prescribed condition, a card 41 corresponding to the prescribed condition is excluded from the game field or is moved to the card deck of the local user or the other user. For example, replay logs may exhaustively include histories of information such as the information described above.

Note that the cards 41 (card group) may be media (medium group) such as characters or items, and the possessed card group may be a possessed medium group constructed to include a plurality of media possessed by the user. For example, in the case where the medium group is constituted of media including characters and items, the game screen 40 shows characters or items themselves as cards 41.

FIG. 1 is a block diagram showing the hardware configuration of the learning device 10 in one embodiment of the present invention. The learning device 10 includes a processor 11, an input device 12, a display device 13, a storage device 14, and a communication device 15. These individual constituent devices are connected via a bus 16. Note that interfaces are interposed as needed between the bus 16 and the individual constituent devices. The learning device 10 includes a configuration similar to that of an ordinary server, PC, or the like.

The processor 11 controls the operation of the learning device 10 as a whole; for example, the processor 11 is a CPU. The processor 11 executes various kinds of processing by loading programs and data stored in the storage device 14 and executing the programs. The processor 11 may be constituted of a plurality of processors.

The input device 12 is a user interface that accepts inputs to the learning device 10 from a user; for example, the input device 12 is a touch panel, a touchpad, a keyboard, a mouse, or buttons. The display device 13 is a display that displays application screens, etc. to the user of the learning device 10 under the control of the processor 11.

The storage device 14 includes a main storage device and an auxiliary storage device. The main storage device is a semiconductor memory, such as a RAM. The RAM is a volatile storage medium that allows high-speed reading and writing of information and is used as a storage area and a work area when the processor 11 processes information. The main storage device may include a ROM, which is a read-only, non-volatile storage medium. The auxiliary storage device stores various programs as well as data that is used by the processor 11 when executing the individual programs. The auxiliary storage device may be any type of non-volatile storage or non-volatile memory that is capable of storing information, which may be of the removable type.

The communication device 15 sends data to and receives data from other computers, such as user terminals and servers, via a network; for example, the communication device 15 is a wireless LAN module. The communication device 15 may be a wireless communication device or module of other types, such as a Bluetooth (registered trademark) module, or may be a wired communication device or module, such as an Ethernet (registered trademark) module or a USB interface.

The learning device 10 is configured to be able to acquire replay logs from a game server, where the replay logs refer to history data concerning the game. A replay log is configured to include a plurality of replay-log element groups, which are per-battle history data. The replay log includes game state data and action data. For example, each of the replay-log element groups includes data of game states and actions arranged along the elapse of time. In this case, each of the items of data of game states and actions is a replay log element. In one example, a replay-log element group includes a card 41 or a character 45 selected by each user, as well as information concerning an attack associated therewith, on a per-turn and per-user basis. In one example, a replay-log element group includes a card 41 or a character 45 selected by each user, as well as information concerning a generated prescribed effect or event associated therewith, on a per-turn and per-user basis. Alternatively, a replay-log element group may be history data per predefined unit.

In this embodiment, a game state at least indicates information that can be viewed or recognized by the user via a game play, for example, via a game operation or what is displayed on the game screen. Game state data includes data of the cards 41 placed in the game field 43. Each item of game state data is data corresponding to the game state at each timing while the game proceeds. Game state data may include information concerning the cards 41 in the first card group 42*a* (or the possessed card group) of the local user, and may also include information concerning the cards 41 in the first card group 42*b* (or the possessed card group) of the other user.

In this embodiment, an action is executed in response to a user operation in a certain game state, and may change that game state. For example, an action is an attack by one card 41 or character 45 on another card 41 or character 45, the generation of a prescribed effect or event by one card 41 or character 45, or the like. For example, an action is executed in response to a user selecting a card 41 or the like. Each item of action data is data corresponding to an action selected by a user in each game state. In one example, action data includes data indicating that a user has selected a card 41 for an attack and a card 41 to be attacked in one game state. In one example, action data includes data indicating that a user has selected a card 41 to use in one game state.

In one example, a replay log is defined in terms of a sequence of game state data and action data, where the game state data indicate the states of the game field 43 in the form of tree-structured text data, and the action data indicate actions executed by a user in those game states. In one example, each of the replay-log element groups is an array including the pair of an initial game state and the first action, as well as the pairs of game states resulting from being affected by actions and the next actions, and terminated with the final game state in which the outcome was finally determined, and can be expressed by formula (1).

$$\text{Replaylog}_n := [\text{State}_0, \text{Action}_0, \text{State}_1, \text{Action}_1, \ldots, \text{State}_e] \quad (1)$$

Here, $\text{State}_i$ signifies the i-th game state, $\text{Action}_i$ signifies the i-th action executed, and $\text{State}_e$ signifies the final game state, such as a victory or defeat, a draw, or a no contest.

In one example, $\text{State}_i$ signifies the set of cards 41 placed in the game field 43 and the cards 41 possessed by users and can be expressed by formula (2).

$$\text{State}_i := [\text{card}_0^{sp1}, \ldots, \text{card}_{na}^{sp1}, \text{card}_0^{sp2}, \ldots, \text{card}_{nb}^{sp2}, \text{card}_0^{dp1}, \ldots, \text{card}_{nc}^{dp1}, \text{card}_0^{dp2}, \ldots, \text{card}_{nd}^{dp2}] \quad (2)$$

Here, $\text{card}_0^{sp1}, \ldots, \text{card}_{na}^{sp1}$ signifies the zeroth to na-th cards of player 1 (playing first), placed in the game field 43, $$\text{card}_0^{sp2}, \ldots, \text{card}_{nb}^{sp2}$$

signifies the zeroth to nb-th cards of player 2 (playing second), placed in the game field 43, $$\text{card}_0^{dp1}, \ldots, \text{card}_{nc}^{dp1}$$

signifies the zeroth to nc-th cards included in the hand of player 1 (playing first), and $$\text{card}_o^{dp2}, \ldots, \text{card}_{nd}^{dp2}$$

signifies the zeroth to nd-th cards included in the hand of player 2 (playing second). For example, in the case where one card of player 1 is placed in the game field 43, $\text{State}_i$ includes only the following data as the card of player 1 placed in the game field 43.

$$\text{card}_0^{sp1}$$

In the case where the number of cards is zero, $\text{State}_i$ includes data indicating that no cards of player 1 are placed in the game field 43. This also applies to the cards of player 2 placed in the game field 43, the cards included in the hands, etc. Alternatively, $\text{State}_i$ may be configured to include the cards 41 placed in the game field 43, while not including the cards 41 possessed by users. Alternatively, $\text{State}_i$ may include information other than cards 41.

Each card $\text{card}_i$ can be expressed by formula (3).

$$\text{card}_i := \{\text{name}, \text{explanation}\}$$

Here, "name" signifies text data indicating the name of the card, and "explanation" signifies text data explaining the ability or skill of the card.

In this embodiment, each of the replay-log element groups stored in the game server is associated with user information (player information) of player 1 and player 2 who play a battle against each other. The user information is stored in the game server and includes an ID for identifying each user, as well as a user rank (player rank). The user rank refers to the winning rate ranking of a user, indicating a place in the winning rate. Alternatively, the user rank refers to battle points that increase or decrease in accordance with the results of battles, indicating the strength in the game. Instead of the user rank or in addition to the user rank, the user information may include at least one of the winning rate, the degree of following an ideal winning pattern, and the total value of damage given. The user information associated with each of the replay-log element groups may be the user information of the player having a higher user rank between player 1 and player 2, the user information of the winning player indicated by the replay-log element group, the user information of the two player who played a battle against each other, or the like.

Figure 2:
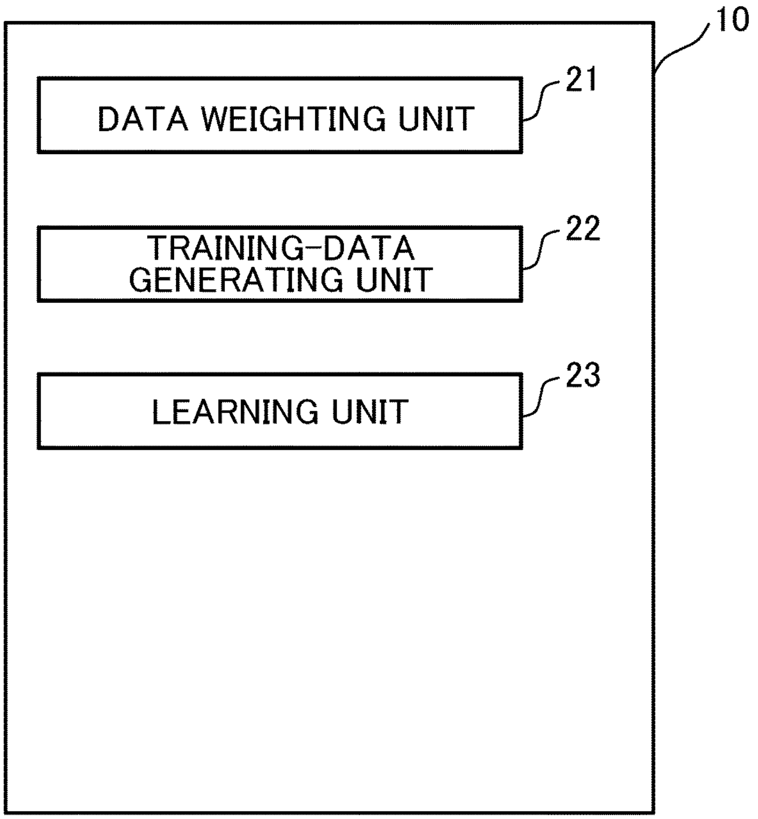
FIG. 2 is a functional block diagram of the learning device in one embodiment of the present invention.

FIG. 2 is a functional block diagram of the learning device 10 in one embodiment of the present invention. The learning device 10 includes a data weighting unit 21, a training-data generating unit 22, and a learning unit 23. In this embodiment, these functions are realized by the processor 11 executing programs stored in the storage device 14 or received via the communication device 15. Since various functions are realized by loading programs, as described above, a portion or the entirety of one part (function) may be provided in another part. Alternatively, however, these functions may be realized by means of hardware by configuring electronic circuits or the like for realizing the individual functions in part or in entirety.

The data weighting unit 21 determines weights for the individual replay-log element groups on the basis of the user information associated with the individual replay-log element groups. For example, the data weighting unit 21 determines a weight for one replay-log element group A on the basis of the user information associated with the replay-log element group A.

The training-data generating unit 22 converts game state data and action data included in the replay-log element groups into game-state explanation text and action explanation text, which are controlled natural language data expressed in a prescribed format. Game-state explanation text and action explanation text are created as described above. In this embodiment, the training-data generating unit 22 generates game-state explanation text and action explanation text from game state data and action data by using a rule-based system prepared in advance. In this embodiment, the controlled natural language expressed in a prescribed format is a natural language in which the grammar and vocabulary are controlled so as to satisfy prescribed requirements, which is generally called a controlled natural language (CNL). For example, the CNL is expressed in English. In this case, the CNL is expressed in English having restrictions such as a restriction that relative pronouns are not to be included. The training-data generating unit 22 generates training data (teacher data) including the generated (converted) pairs of game-state explanation text and action explanation text. The data in the controlled natural language (CNL) expressed in a prescribed format is an example of text data expressed in a prescribed format, such as text data expressed by using grammar, syntax, and vocabulary that are suitable for mechanical conversion into a distributed representation. In one example, for each of the replay-log element groups included in the replay logs to be learned (e.g., the replay logs acquired by the learning device 10), the training-data generating unit 22 generates data corresponding to one or more pairs of game-state explanation text and action explanation text from one or more pairs of game state data and action data included in the replay-log element group. Note that, in this embodiment, generating data such as training data may mean creating such data in general.

Figure 4:
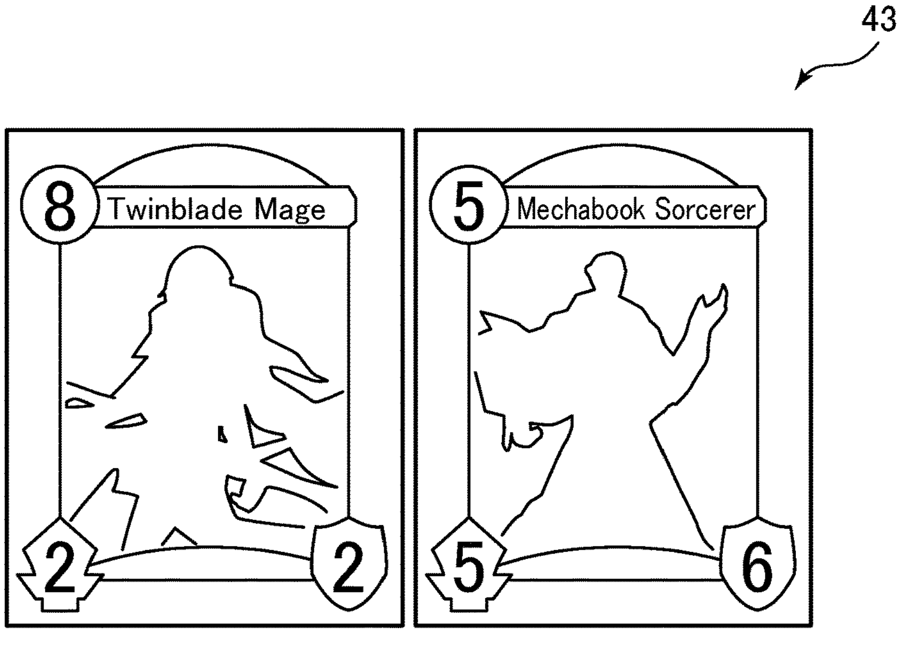
FIG. 4 shows an example game state.

FIG. 4 shows an example game state. For simplicity of description, in the game state shown in FIG. 4, only two cards are placed on the player 1 side of the game field 43. In the game state shown in FIG. 4, the two cards 41 of player 1 placed in the game field 43 are a card of Twinblade Mage and a card of Mechabook Sorcerer. In one example, the game state data included in a replay-log element group is the following text data.

| |
|---|
| Twinblade Mage Storm Fanfare: Deal 2 damage to an enemy follower Spellboost: Subtract 1 from the cost of this card. Mechabook Sorcerer. |

In this case, the training-data generating unit 22 converts the above game state data into the following game-state explanation text (CNL).

| |
|---|
| A Twinblade Mage on the player1 side, with Storm, Fanfare: Deal 2 damage to an enemy follower, Spellboost: Subtract 1 from the cost of this card. An evolved Mechabook Sorcerer on the player1 side. |

The training-data generating unit 22 generates one sentence per card by adding underlined words and commas. Each sentence includes words indicating the place where the corresponding card is placed, such as "on the player1 side", words indicating attributes, such as "with" and "evolved", and commas indicating separators between words. For example, the game-state explanation text given above indicates the following: "Twinblade Mage on the player1 side, with Storm, Fanfare that gives two units of damage to the follower of the enemy, and Spellboost that subtracts one from the cost of this card. An evolved Mechabook Sorcerer on the player1 side."

In the case where game state data is text data recorded in a predefined format, as described above, the training-data generating unit 22 can convert the game state data into the CNL by adding prescribed words, commas, periods, etc. to the text data by using known technology of a rule-based system. The rule-based system that is used for this conversion is created in advance, and it becomes possible for the learning device 10 to convert game state data into the CNL by communicating with the rule-based system via the communication device 15. When converting game state data into the CNL, the training-data generating unit 22 may further use information with which the game state data is associated (e.g., explanation data of the cards included in the game state data). Alternatively, the rule-based system may be included in the learning device 10.

The conversion of action data into action explanation text is similar to the conversion of game state data into game-state explanation text. In one example, action data included in a replay-log element group is the following text data.

Fighter Fairy Champion.

The training-data generating unit 22 converts the above action data into the following action explanation text (CNL).

A player1's Fighter attacked Fairy Champion.

The training-data generating unit 22 creates one sentence per action by adding underlined words, etc. For example, the above action explanation text indicates that "Fighter" of player 1 attacked "Fairy Champion".

In one example, the conversion into game-state explanation text by the training-data generating unit 22 is realized by using an encode function expressed in formula (4).

$$\text{encode}(\text{State}_i) \rightarrow \text{State\_T}_i \tag{4}$$

The encode function is a function that receives $State_i$ of the i-th game state data and that converts the received $State_i$ into data $State\_T_i$ in the controlled natural language expressed in a prescribed format, by using the explanation attribute, expressed in formula (3), of each of the cards in $State_i$, as well as the rule-based system. The conversion into action explanation text ($Action\_T_i$) by the training-data generating unit 22 can also be realized by using a function having a similar role as the encode function expressed in formula (4).

As expressed in formula (1), each of the replay-log element groups has a data structure in which $State_k$ and $Action_k$ are paired, where k is an arbitrary number (e.g., $State_0$ and $Action_0$ are paired, and Stater and Actions are paired). In other words, each of the replay-log element group has a data structure in which data in one game state ($State_k$) and data of an action ($Action_k$) selected in the one game state are paired, except for the final game state. The training-data generating unit 22 converts data in one game state ($State_k$) and data of an action ($Action_k$) selected in the one game state to generate training data including game-state explanation text ($State\_T_k$) and action explanation text ($Action\_T_k$) corresponding to the pair of the one game state and the action selected in the one game state.

Since a majority of game state data include a plurality of elements (data of a plurality of cards), it is assumed in the embodiment described below that game state data includes data of a plurality of cards. The game-state explanation text ($State\_T_k$) generated (converted) from data in one game state ($State_k$) by the training-data generating unit 22 includes a plurality of sentences. In this embodiment, each of the sentences included in game-state explanation text corresponding to one game state corresponds to each of the elements (data of cards) included in game state data. As game-state explanation text ($State\_T_k$) corresponding to data in one game state ($State_k$), the training-data generating unit 22 generates a plurality of items of game-state explanation text by shuffling the order of the plurality of sentences included in the game-state explanation text. As described above, as game-state explanation text corresponding to data in one game state (Statek), the training-data generating unit 22 generates a plurality of game-state explanation text (a plurality of patterns of game-state explanation text) having different orders of sentences included in the game-state explanation text. The generated plurality of patterns of game-state explanation text may include the game-state explanation text having the pattern of the original order of sentences. Note that the plurality of items of game-state explanation text generated by the training-data generating unit 22 as game-state explanation text ($State\_T_k$) corresponding to data ($State_k$) in one game state may also include items of game-state explanation text having the same order of sentences. Furthermore, the training-data generating unit 22 may use known methods other than shuffling when generating a plurality of items of game-state explanation text having different orders of sentences.

The training-data generating unit 22 generates text data including pairs of individual items of game-state explanation text generated in the manner described above and items of action explanation text corresponding to actions selected in the game states from which the items of game-state explanation text were derived, and generates training data including the generated text data. The action explanation text generated here is action explanation text ($Action\_T_k$) generated from data of an action ($Action_k$) selected in the game state ($State_k$) from which the game-state explanation text was derived. In the case where a pair of game-state explanation text and action explanation text corresponding to one game state is generated, as described above, the items of action explanation text paired with the individual items of generated game-state explanation text are the same action explanation text.

Assuming that the game-state explanation text corresponding to $State_k$ includes $N_k$ sentences, the number of permutations of the sentences is $N_k!$. As game-state explanation text ($State\_T_k$) corresponding to $State_k$, the training-data generating unit 22 generates m items of game-state explanation text having different orders of sentences. m is an integer greater than or equal to one. The training-data generating unit 22 generates m items of game-state explanation text, where m is a number based on a weight W determined by the data weighting unit 21 for the replay-log element group including the data ($State_k$) of the game state. The m items of game-state explanation text include the same sentences in different orders. Alternatively, the m items of game-state explanation text may include items of game-state explanation text having the same order of sentences. Here, in the case where $Replaylog_\beta$ of the β-th replay-log element group includes γ pairs of $State_k$ (k=1 to γ) and $Action_k$ (k=1 to γ), it is assumed that the number of items of game-state explanation text corresponding to $State_k$ varies depending on $State_k$ (i.e., depending on k). In the case where the data weighting unit 21 has determined a weight $W_\beta$ for $Replaylog_\beta$, the training-data generating unit 21 generates m items of game-state explanation text based on the weight $W_\beta$ for each $State_k$. In one example, the weight $W_\beta$ determined by the data weighting unit 21 is the integer m. In the case where $W_\beta$=m, as described above, $W_\beta$ (=m) may be used the number based on the weight $W_\beta$. In one example, the training-data generating unit 22 determines an integer m that is greater than or equal to one on the basis of the weight $W_\beta$, and generates m items of game-state explanation text for each $State_k$. In the above example, in the case where the number of permutations $N_k!$ of the items of game-state explanation text corresponding to $State_k$ is less than m, the items of game-state explanation text corresponding to $State_k$ include items of game-state explanation text having the same order of sentences.

In one example, the data weighting unit 21 determines a weight W such that the magnitude thereof corresponds to the level of the user rank included in the user information. For example, when the winning rate ranking of a user is P-th, the data weighting unit 21 determines a weight W corresponding to the magnitude of 1/P. The training-data generating unit 22 receives or determines, as the number m, the weight W determined by the data weighting unit 21, or determines or sets m such that the number m of items of game-state explanation text to be generated increases in accordance with the magnitude of the weight W. For example, for the weight W determined by the data weighting unit 21 for one replay-log element group and the number m of items of game-state explanation text ($State\_T_k$) determined for the data (Stated of one game state included in the same replay-log element group, the training-data generating unit 22 determines m such that m takes the maximum value when W takes the maximum value and such that m takes the minimum value when W takes the minimum value. Note that m is an integer greater than or equal to one. In one example, the function of determining m by the training-data generating unit 22 is realized by using a function that receives a weight as an argument.

In one example, $Metadata_n$, which is a data structure that is referred to when the data weighting unit 21 determines a weight, can be expressed by formula (5).

$$Metadata_n := [Key_0, Value_o, Key_1, Value_1 \ldots, Key_M, Value_M] \quad (5)$$

Here, $Key_i$ signifies the i-th key (name) of the metadata, and $Value_i$ signifies the value of the metadata corresponding to the i-th key. For example, a user rank indicating the battle history and strength of a user is stored in a form such as Key=Rank, Value=Master. As $Metadata_n$, it is possible to store various values that can be calculated in the game, such as the degree of following an ideal winning pattern defined for each class, as well as the total value of damage given. $Metadata_n$ is user information associated with an ID for identifying a user, and is metadata corresponding to $Replaylog_n$ of the n-th replay-log element group.

In one example, the data weighting unit 21 calculates (determines) a weight by using a weight function expressed in formula (6).

$$\text{weight}(Metadata_i) \rightarrow [\text{MIN} \ldots \text{MAX}] \qquad (6)$$

This function calculates a weight in the form of a non-negative integer greater than or equal to MIN and less than MAX by using the metadata $Metadata_i$ corresponding to $Replaylog_i$ of the i-th replay-log element group. In one example, the weight function calculates MAX?P as a weight when the winning rate ranking of the user, acquired from the metadata, is P-th. This makes it possible to apply greater weights to replay logs of higher-ranking players.

Figure 5:
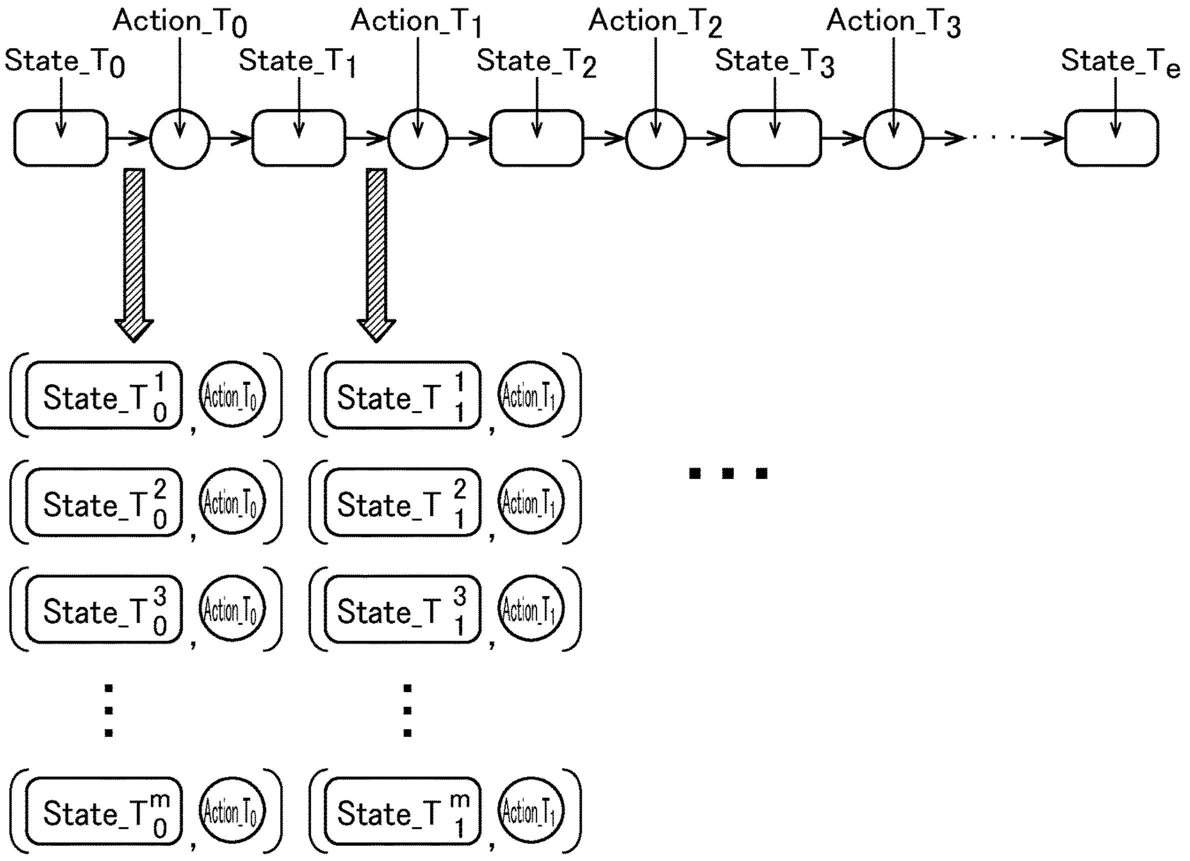
FIG. 5 shows an overview of how the learning device generates pairs of game-state explanation text and action explanation text from a replay log.

FIG. 5 is an illustration showing how the learning device 10 generates pairs of game-state explanation text and action explanation text from a replay-log element group. As game-state explanation text ($State\_T_0$) corresponding to $State_0$, the training-data generating unit 22 generates m items of game-state explanation text.

$$State\_T_0^1, State\_T_0^2, State\_T_0^m$$

The individual elements given above are m items of game-state explanation text generated as game-state explanation text corresponding to $State_0$. The training-data generating unit 22 generates pairs of the individual items of generated game-state explanation text and action explanation text ($Action\_T_0$) generated from the data $Action_0$ of the action selected in the game state of $State_0$.

Similarly, as game-state explanation text corresponding to Stater, the training-data generating unit 22 generates m items of game-state explanation text given below.

$$State\_T_1^1, State\_T_1^2, \ldots, State\_T_1^m$$

The training-data generating unit 22 generates pairs of the individual items of generated game-state explanation text and action explanation text ($Action\_T_1$) generated from the data Actions of the action selected in the game state of Stater.

For each of the items of data for all the game states except the final game state ($State_e$), the training-data generating unit 22 generates m items of game-state explanation text as game-state explanation text corresponding to the game state data, and generates pairs (text data) of the m items of generated game-state explanation text and the corresponding action explanation text. The training-data generating unit 22 generates pairs of game-state explanation text and action explanation text in the manner described above, and generates training data including the generated pairs (text data).

Alternatively, the training-data generating unit 22 may be configured to generate game-state explanation text corresponding to game state data only for some items of game state data and to generate pairs of the m items of generated game-state explanation text and corresponding action explanation text.

In one example, the shuffling of the order of a plurality of sentences included in game-state explanation text, executed by the training-data generating unit 22, is realized by using a shuffle function expressed in formula (7).

$$\text{shuffle}(State_i, m) \rightarrow [State\_T_i^1, State\_T_i^2, \ldots, State\_T_i^m] \qquad (7)$$

Here, m signifies a number based on the weight determined by the data weighting unit 21 for the corresponding replay-log element group. The shuffle function receives $State\_T_i$ of the i-th item of game-state explanation text, and generates m items of $State\_T_i$ by shuffling the order of elements in $State\_T_i$. For example, the item of game-state explanation text generated as a result of shuffling once is expressed as follows:

$$State\_T_i^1$$

The item of game-state explanation text generated as a result of shuffling twice is expressed as follows:

$$State\_T_i^2$$

The item of game-state explanation text generated as a result of shuffling m times is expressed as follows:

$$State\_T_i^m$$

In this embodiment, the shuffle function generates m items of $State\_T_i$ by shuffling the order of sentences in $State\_T_i$.

Note that the learning device 10 may be configured to generate, in the case where game-state explanation text includes only one sentence, only text data of the pair of that game-state explanation text and action explanation text.

The learning unit 23 generates a trained model, on the basis of training data generated by the training-data generating unit 22, by performing machine learning, for example, with the training data. In this embodiment, the learning unit 23 generates a trained model by training a pretrained natural language model with training data (teacher data) including pairs of game-state explanation text and action explanation text, the pretrained natural language model having learned in advance grammatical structures and text-to-text relationships concerning a natural language.

The trained natural language model is stored in another device that is different from the learning device 10, and the learning device 10 trains the trained natural language model by carrying out communication with the other device via the communication device 15, and acquires the trained model obtained through training from the other device. Alternatively, the learning device 10 may store the trained natural language model in the storage device 14.

The trained natural language model is a learning model (trained model) generated by learning a large amount of natural language text in advance by using learning of grammatical structures and learning of text-to-text relationships. The learning of grammatical structures, for example, for the purpose of learning the structure of the sentence "My dog is hairy", refers to learning the following three patterns: (1) word masking "My dog is [MASK]"; (2) random word substitution "My dog is apple"; and no word manipulation "My dog is hairy". The learning of text-to-text relationships, for example, in the case where there are pairs (sets) of two successive sentences to be learned, refers to creating original pairs of two sentences (correct pairs) and pairs of randomly selected pairs (incorrect pairs) half and half and learning whether or not there is relevance between sentences as a binary classification problem.

In one example, the pretrained natural language model is a trained model called BERT, provided by Google. The learning unit 23 communicates with the BERT system via the communication device 15 to train BERT with training data and to obtain the generated trained model. In this case, the learning unit 23 generates a trained model by fine-tuning the pretrained natural language model by using natural language data of game-state explanation text and action explanation text as training data. The fine-tuning refers to retraining the pretrained natural language model to reweight parameters. Therefore, in this case, the learning unit 23 retrains the pretrained natural language model, which has already been trained, with game-state explanation text and action explanation text, thereby slightly adjusting the pretrained natural language model to generate a new trained model. In this embodiment, as described above, generating a trained model includes obtaining a trained model by fine-tuning or reweighting a trained model generated in advance through training.

In this embodiment, the learning unit 23 trains the pretrained natural language model with text-to-text relationships. In relation to this training, processing by the training-data generating unit 22 in this embodiment will be further described.

As described earlier, the training-data generating unit 22 generates, as first pairs, pairs of game-state explanation text and action explanation text corresponding to pairs of data of one game state and data of an action selected in the one game state, on the basis of game state data and action data included in a replay log (replay-log element group). In addition, the training-data generating unit 21 generates second pairs of game-state explanation text and action explanation text corresponding to pairs of data of the one game state and data of an action randomly selected from actions selectable by a user in the one game state and not included in the first pairs. As described above, the training-data generating unit 22 generates second pairs such that the action explanation text paired with the same game-state explanation text varies between the first pairs and the second pairs. The training-data generating unit 22 generates training data including the first pairs and the second pairs. In one example, the training-data generating unit 22 generates first pairs and second pairs for the data of all the game states included in the replay log element groups obtained by the learning device 10, and generates training data including these pairs.

As one example, the following describes processing in the case where the training-data generating unit 22 generates training data including game-state explanation text ($State\_T_N$) corresponding to $State_N$, which is data of one game state. From $State_N$ and $Action_N$ included in a replay-log element group, where $Action_N$ signifies data of an action selected in $State_N$, the training-data generating unit 22 generates pairs (first pairs) of game-state explanation text ($State\_T_N$) and action explanation text ($Action\_T_N$) corresponding to these items of data. From $State_N$ included in the replay-log element group and data of actions that are randomly selected from actions selectable in $State_N$ and that are not $Action_N$, the training-data generating unit 22 generates pairs (second pairs) of game-state explanation text ($State\_T_N$) and action explanation text ($Action\_T'_N$) corresponding to these items of data.

As described earlier, the training-data generating unit 22 generates m items of game-state explanation text for one item of game-state explanation text ($State\_T_N$), and thus generates m first pairs per one item of game-state explanation text. Similarly, the training-data generating unit 22 generates m second pairs. For example, the first pairs can be expressed by formula (8).

$$[(State\_T_N^1, Action\_T_N), (State\_T_N^2, Action\_T_N), \ldots, (State\_T_N^m, Action\_T_N)] \tag{8}$$

For example, the second pairs can be expressed by formula (9).

$$[(State\_T_N^1, Action\_T'_N), (State\_T_N^2, Action\_T'_N), \ldots, (State\_T_N^m, Action\_T'_N)] \tag{9}$$

The training-data generating unit 22 generates training data including the first pairs and the second pairs in this manner.

The learning unit 23 trains the pretrained natural language model with the first pairs as correct data while assigning thereto, for example, "IsNext", and trains the pretrained natural language model with the second pairs as incorrect data while assigning thereto, for example, "NotNext".

In one example, the learning unit 23 trains a trained model with training data (teacher data) by using a learn function. The learn function performs learning by fine-tuning a pretrained natural language model, such as BERT, by using the first pairs and the second pairs of game-state explanation text and action explanation text, expressed in formulas (8) and (9). A trained model (neural network model) is generated as a result of the fine tuning. The learning here refers to updating the weights in the individual layers constituting a neural network by applying deep learning technology. In this embodiment, the number m of pairs of game-state explanation text and action explanation text to be learned is a number based on the weight W determined for each replay-log element group. As such, adjustment such as applying strong weights to specific replay-log element groups and applying weak weights to other replay-log element groups can be controlled in terms of the amount of data that is passed to the learn function.

Figure 6:
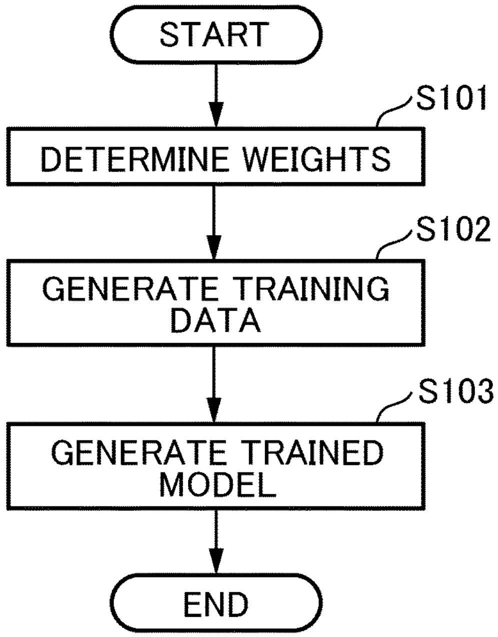
FIG. 6 is a flowchart showing a process of generating a trained model, which is executed by the learning device in one embodiment of the present invention.

Next, a process of generating a trained model, executed by the learning device 10, in one embodiment of the present invention will be described with reference to a flowchart shown in FIG. 6.

In step 101, the data weighting unit 21 determines weights for the individual replay-log element groups on the basis of the user information associated with the individual replay-log element groups.

In step 102, the training-data generating unit 22 generates game-state explanation text and action explanation text from game state data and action data included in the replay-log element groups, and generates training data including pairs of game-state explanation text and action explanation text corresponding to pairs of one game state and an action selected in the one game state. Here, as game-state explanation text corresponding to one game state, the training-data generating unit 22 generates m items of game-state explanation text, where m is a number based on the weight determined for the history-data element group including data of the one game state. Here, the generated m items of game-state explanation text include items of game-state explanation text having different orders of a plurality of sentences included in the game-state explanation text.

In step 103, the learning unit 23 generates a trained model on the basis of the training data generated by the training-data generating unit 22.

Figure 7:
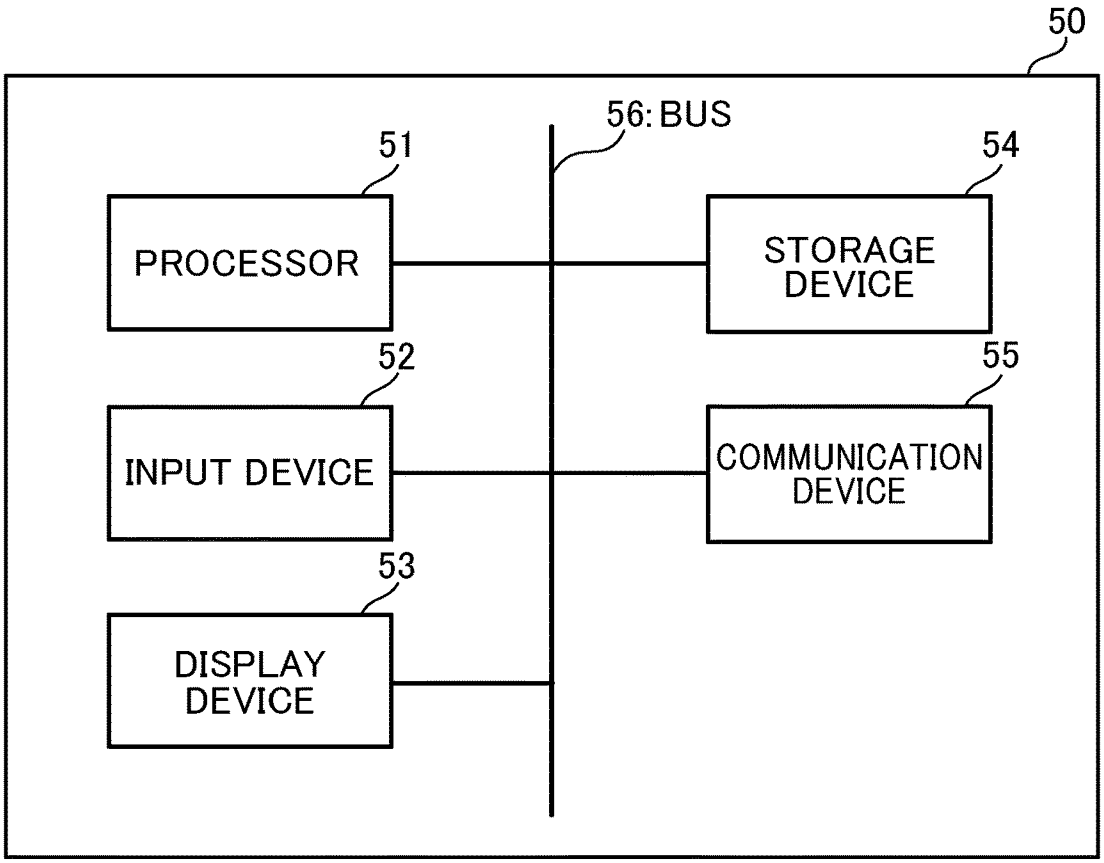
FIG. 7 is a block diagram showing the hardware configuration of a determining device in one embodiment of the present invention.

FIG. 7 is a block diagram showing the hardware configuration of the determining device 50 in one embodiment of the present invention. The determining device 50 includes a processor 51, an input device 52, a display device 53, a storage device 54, and a communication device 55. These individual constituent devices are connected via a bus 56. Note that interfaces are interposed as needed between the bus 56 and the individual constituent devices. The determining device 50 includes a configuration similar to that of an ordinary server, PC, or the like.

The processor 51 controls the operation of the determining device 50 as a whole; for example, the processor 51 is a CPU. The processor 51 executes various kinds of processing by loading programs and data stored in the storage device 54 and executing the programs. The processor 51 may be constituted of a plurality of processors.

The input device 52 is a user interface that accepts inputs to the determining device 50 from a user; for example, the input device 52 is a touch panel, a touchpad, a keyboard, a mouse, or buttons. The display device 53 is a display that displays application screens, etc. to the user of the determining device 50 under the control of the processor 51.

The storage device 54 includes a main storage device and an auxiliary storage device. The main storage device is a semiconductor memory, such as a RAM. The RAM is a volatile storage medium that allows high-speed reading and writing of information, and is used as a storage area and a work area when the processor 51 processes information. The main storage device may include a ROM, which is a read-only, non-volatile storage medium. The auxiliary storage device stores various programs as well as data that is used by the processor 51 when executing the individual programs. The auxiliary storage device may be any type of non-volatile storage or non-volatile memory that is capable of storing information, which may be of the removable type.

The communication device 55 sends data to and receives data from other computers, such as user terminals and servers, via a network; for example, the communication device 55 is a wireless LAN module. The communication device 55 may be a wireless communication device or module of other types, such as a Bluetooth (registered trademark) module, or may be a wired communication device or module, such as an Ethernet (registered trademark) module or a USB interface.

Figure 8:
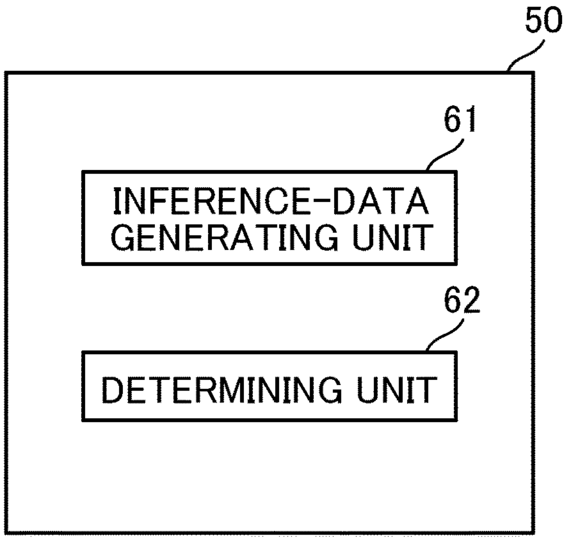
FIG. 8 is a functional block diagram of the determining device in one embodiment of the present invention.

FIG. 8 is a functional block diagram of the determining device 50 in one embodiment of the present invention. The determining device 50 includes an inference-data generating unit 61 and a determining unit 62. In this embodiment, these functions are realized by the processor 51 executing programs stored in the storage device 54 or received via the communication device 55. Since various functions are realized by loading programs, as described above, a portion or the entirety of one part (function) may be provided in another part. Alternatively, however, these functions may be realized by means of hardware by configuring electronic circuits or the like for realizing the individual functions in part or in entirety. In one example, the determining device 50 receives data of a game state subject to prediction from a game system such as game AI, performs inference by using a trained model generated by the learning device 10, and sends action data to the game system.

The inference-data generating unit 61 generates inference data subject to inference, which is input to a trained model generated by the learning device 10. The inference-data generating unit 61 determines actions selectable by a user in a game state subject to prediction. Usually, a plurality of actions are selectable by a user. In one example, the inference-data generating unit 61 determines actions selectable by a user from the game state subject to prediction, for example, from the cards 41 placed in the game field 43 or the cards 41 in the hand. In another example, the inference-data generating unit 61 receives actions selectable by a user, together with data of the game state subject to prediction, from a game system such as game AI, and determines the received actions as actions selectable by a user. In another example, actions selectable by a user in a certain game state are predefined in the game program, and the inference-data generating unit 61 determines actions selectable by a user for each game state according to the game program.

In one example, the inference-data generating unit 61 receives game state data in the same data format as a replay-log element group, and determines action data in the same data format as a replay-log element group.

The inference-data generating unit 61, for the individual actions determined, generates pairs of game-state explanation text and action explanation text from the pairs of game state data and action data. In the case where an action to be selected by a user in one game state subject to prediction is predicted, the items of game-state explanation text paired with the individual items of action explanation text generated for the individual actions determined are the same game-state explanation text. In one example, the inference-data generating unit 61 generates pairs of game-state explanation text and action explanation text from pairs of game state data and action data by using the same rule-based system as the rule-based system used by the training-data generating unit 22. In this case, for example, the determining device 50 can convert game state data and action data into game-state explanation text and action explanation text in the CNL by communicating with the rule-based system via the communication device 15. Alternatively, the rule-based system may be included in the determining device 50.

The determining unit 62 determines an action that is predicted to be selected by a user by using the individual pairs of game-state explanation text and action explanation text generated by the inference-data generating unit 61, as well as a trained model generated by the learning device 10. As an example, the following describes the case where the data of the game state subject to prediction is $State_\alpha$ and the action data corresponding to actions selectable by the user in the game state are the following.

$$Action_\alpha^1, Action_\alpha^2, \ldots, Action_\alpha^k$$

The game-state explanation text corresponding to the game state data ($State_{\alpha}$) is $State\_T_{\alpha}$, and the items of action explanation text corresponding to the action data are the following.

$$Action\_T_{\alpha}^{1}, Action\_T_{\alpha}^{2}, \ldots , Action\_T_{\alpha}^{k}$$

The inference-data generating unit 61 generates pairs of State_Tα and the following individual items of action explanation text.

$$Action\_T_{\alpha}^{1}, Action\_T_{\alpha}^{2}, \ldots , Action\_T_{\alpha}^{k}$$

The determining unit 62 inputs each of the pairs generated by the inference-data generating unit 61 to the trained model generated by the learning device 10, and calculates a score indicating whether or not the action can be performed by the user. The determining unit 62 determines an action corresponding to one item of action explanation text on the basis of the calculated scores. In one example, the determining unit 62 determines an action corresponding to the item of action explanation text of the pair having the highest score, and sends information concerning the determined action to the game system from which data of the game state subject to prediction has been received.

In one example, the trained model generated by the learning device 10 implements an infer function expressed in formula (10).

$$\text{infer}(\text{list of } Action\_T_{\alpha}^{i}, State\_T_{\alpha}) \rightarrow [(Action\_T_{\alpha}^{i}, Score_1), (Action\_T_{\alpha}^{2}, Score_2), \ldots , (Action\_T_{\alpha}^{k}, Score_k)] \quad (10)$$

The infer function receives, from the determining unit 62, game-state explanation text ($State\_T_{\alpha}$) corresponding to the game state subject to prediction and a list of the items of action explanation text corresponding to actions selectable by the user in the game state, given below.

$$\text{list of } Action\_T_{\alpha}^{i}$$

The infer function assigns a real-value score in the range of 0 to 1, indicating whether or not the action is to be performed next, to each item of action explanation text (or action), and outputs pairs of the individual items of action explanation text (or actions) and the scores. For example, with these scores, 0 indicates an action that is the least desirable for selection, and 1 indicates an action that is the most desirable for selection.

In one example, the determining unit 62 selects an action that is predicted to be selected by the user by using a select function. The select function determines an item of action explanation text that is predicted to be selected by the user, or an action corresponding thereto, from the pairs of items of action explanation text and scores output by the infer function. The select function is configured to select an action corresponding to the item of action explanation text of the pair having the highest score. Alternatively, the select function may be configured to select an action corresponding to the item of action explanation text of the pair having the second highest score, the third highest score, or the like.

Figure 9:
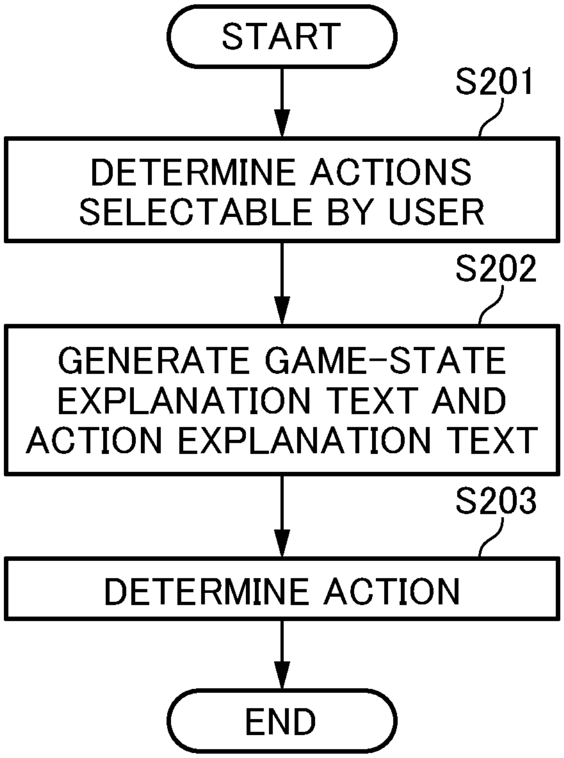
FIG. 9 is a flowchart showing a process of determining an action that is predicted to be selected by the user, which is executed by the determining device in one embodiment of the present invention.

Next, a process of determining an action that is predicted to be selected by a user, executed by the determining device 50, in one embodiment of the present invention will be described with reference to a flowchart shown in FIG. 9.

In step 201, the inference-data generating unit 61 determines actions selectable by a user in a game state subject to prediction.

In step 202, the inference-data generating unit 61 converts game state data and action data into the CNL to generate pairs of game-state explanation text and action explanation text for the individual actions determined in step 201.

In step 203, the determining unit 62 determines an action that is predicted to be selected by the user by using the individual pairs of game-state explanation text and action explanation text generated in step 202, as well as a trained model generated by the learning device 10.

Next, main operations and advantages of the learning device 10 and the determining device 50 in the embodiment of the present invention will be described.

In this embodiment, the learning device 10 converts pairs of game state and action data included in individual replay-log element groups constituting replay logs stored in a game server into pairs of game-state explanation text and action explanation text in a CNL, and generates training data including the converted text data. The learning device 10 determines weights for the individual replay-log element groups on the basis of the user information associated with the individual replay-log element groups. The learning device 10 generates first pairs and second pairs, the first pairs being pairs of game-state explanation text and action explanation text generated from the replay logs, the second pairs being pairs in which items of action explanation text corresponding to an action randomly selected from actions selectable by the user in the game state corresponding to the same game-state explanation text as in the first pairs and different from the items of action explanation text in the first pairs are paired with that game-state explanation text, and generates training data including the first pairs and the second pairs. The first pairs included in the training data include, for each game state, m items of game-state explanation text in which the order of sentences included in the game-state explanation text are shuffled, and include, for each game state, pairs of the individual items of game-state explanation text and action explanation text. Also, the second pairs included in the training data include, for each game state, the same game-state explanation text as in the first pairs, and include, for each game state, pairs of the individual items of game-state explanation text and action explanation text (action explanation text different from that in the first pairs). Here, for one game state, m, which is the number of items of game-state explanation text included in the first pairs included in the training data, is the weight determined for the replay-log element group including the data of the game state, or is determined on the basis of the weight. The learning device 10 generates a trained model by training a pretrained natural language model with the training data.

Furthermore, in this embodiment, the determining device 50 receives data of a game state subject to prediction from a game system such as game AI, and determines a plurality of actions selectable by a user in the game state subject to prediction. The determining device 50 converts the pairs of game state data and action data into pairs of game-state explanation text and action explanation text for the individual actions determined. The determination device 50 determines an action that is predicted to be selected by the user by using the individual converted pairs and the trained model generated by the learning device 10.

As described above, in this embodiment, as a learning phase, replay logs stored in a game server, which are not natural language data, are rendered into a natural language, and by using the results as inputs, learning is performed by using transformer neural network technology with which natural language processing is possible, thereby generating a trained model. It has hitherto not been practiced to render replay logs into a natural language, as in this embodiment. In this embodiment, natural language processing technology based on a transformer neural network is used as an implementation of a distributed representation model having a high level of context representation ability, which makes it possible to learn replay logs (such as battle histories of a card game) having context. Note that a distributed representation of words represents, in the form of vectors, cooccurrence relationships in which the relative positions of words in sentences or paragraphs are taken into consideration, which is applicable to a wide range of tasks including text summary, translation, and dialog. Furthermore, by learning pairs of game states and actions at individual timings as relationships for next sentence prediction, as in this embodiment, it becomes possible to acquire human tactical thinking via natural language processing technology based on a transformer neural network. Alternatively, instead of rendering replay logs into a natural language, it is possible to attain similar effects as in this embodiment by converting replay logs into text data expressed in a format suitable for mechanical conversion into distributed representations.

Furthermore, with the configuration according to this embodiment, the learning device 10 can determine weights for replay-log element groups, which makes it possible to adjust the number of pairs of game-state explanation text and action explanation text corresponding to each of the replay-log element groups included in training data. This makes it possible to preferentially learn beneficial tactics through "weighted data augmentation", in which a large amount of variations (randomly generated patterns) having the same meaning as the data being learned are automatically generated and learned when learning data with which it is likely that an advantageous tactic was adopted. For example, by utilizing the property of games that the values (winning rates, battle outcomes, etc.) of data can be recognized in advance, it is possible to perform data augmentation method in which a greater number of patterns of more important data are generated, while generating a fewer number of patterns of unimportant data. Existing data augmentation technologies are widely being utilized in machine learning directed to images. However, there have been few attempts for data augmentation directed to natural languages, not going beyond the level of substitutions of synonyms. Furthermore, with manually written natural language text, since it has been difficult to mechanically and correctly evaluate the value or rarity of the text, it has been essentially difficult to calculate weights for data augmentation. That is, data augmentation has not hitherto been utilized for controlling the priority levels of data to be learned. Furthermore, although reinforcement learning is well known as a type of AI suitable for games, with reinforcement learning, since AI is controlled via rewards, it is difficult to directly and arbitrarily control learning. The configuration according to this embodiment enables weighting of training data, which makes it possible to solve the problem described earlier.

Furthermore, in this embodiment, when rendering replay logs into a natural language, replay logs are converted into text with low ambiguity by using a natural language having certain rules, such as a CNL, which makes it possible to generate more appropriate training data.

Furthermore, in this embodiment, when generating first pairs of game-state explanation text and action explanation text, a plurality of patterns are generated by randomly rearranging the order of sentences included in the game-state explanation text. Regarding this feature, since game-state explanation text is text for explaining a game state at the given timing, the order thereof does not have a meaning. Meanwhile, natural language processing technology based on a transformer neural network is directed to learning rules for joining words or word sequences, which makes it possible to directly learn interactions (actions) in conversations that take place along a specific context (game state) under specific grammar (rules) of a card game. By shuffling sentences in game-state explanation text, it is possible to learn the relevance with action explanation text (actions) in the form of distributed representations, without depending on the positions of the sentences, i.e., game state elements, in the game-state explanation text. Note that, in this embodiment, since explanations of cards are also interpreted as natural language text as well as card names, it is possible to autonomously recognize the properties of cards even if the cards are new.

In this embodiment, as an inference phase, game state data, etc. are converted into a natural language (CNL) before being input to a trained model (transformer neural network model), which makes it possible to realize inference utilizing representation ability of distributed representation models. For example, when letting AI play the game, the determining device 50 can input a game state and a set of actions that can be performed in that game state to the trained model, and can select the next choice on the basis of the result and input the choice to the game. In this case, the action that is determined by the determining device 50 is an action that is executed by AI in consideration of an action that the trained model predicts to be selected by the user. As another example, the determining device 50 may be configured to select, when letting AI play the game, an action having the second or third highest score or an action having a score in the vicinity of the median instead of an action having the highest score. This makes it possible to adjust the strength of AI.

Furthermore, the learning method in this embodiment is widely applicable to turn-based battle games, and makes it possible to expand AI that simulate human playing tendencies to a variety of genres. Furthermore, the method of generating a trained model by using fine tuning, which is an example of this embodiment, is a method that is compatible with the case where replay logs are continuously expanded, which makes it suitable for game titles that will be run on a long-term basis. Furthermore, with the training model generated in this embodiment, since explanations of cards are interpreted as natural language text as well as card names, it is possible to perform inference with relatively high accuracy even with new cards that have been newly released. Furthermore, with the method of generating a trained model in this embodiment, without depending on any specific transformer neural network technology or fine tuning method, it is possible to use an arbitrary natural language learning system based on a transformer neural network that support learning for next sentence prediction. Therefore, it is possible to switch the natural language learning system when a neural-network-based natural language learning system having improved accuracy has emerged or depending on the support status of external libraries.

The above operations and advantages also apply to other embodiments and other examples.

An embodiment of the present invention may be a device or system including only the learning device 10, or may be a device or system including both the learning device 10 and the determining device 50. Another embodiment of the present invention may be a method or program for realizing the functions or the information processing shown in the flowcharts in the above-described embodiment of the present invention, or a computer-readable storage medium storing the program. Alternatively, another embodiment of the present invention may be a server that is capable of providing a computer with the program. Furthermore, another embodiment of the present invention may be a system or virtual machine for realizing the functions or the information processing shown in the flowcharts in the above-described embodiment of the present invention.

In the embodiment of the present invention, game-state explanation text and action explanation text generated by the training-data generating unit 22 from game state data and action data are examples of game state text and action text, respectively, which are text data expressed in a prescribed format. Similarly, game-state explanation text and action explanation text generated by the inference-data generating unit 61 from game state data and action data are also example of game state text and action text, respectively, which are text data expressed in a prescribed format. Text data expressed in a prescribed format is data of text that is readable for both machines and humans, such as text data expressed in a format suitable for mechanical conversion into a distributed representation. Game state text corresponding to one game state includes a plurality of text elements. The individual text elements correspond to individual elements included in a game state, such as individual data of cards included in a game state. One text element may be one sentence, one clause, or one phrase. A sentence included in game-state explanation text is an example of element text included in game state text. The embodiment of the present invention may be configured such that individual phrases included in game-state explanation text correspond to individual elements included in a game state.

In the embodiment of the present invention, the pretrained natural language model that is trained with teacher data by the learning unit 23 is an example of a deep learning model directed to learning sequential data.

In the embodiment of the present invention, the CNL may be a language other than English, such as Japanese.

The following describes modifications of the embodiment of the present invention. The modifications described below can be combined as appropriate and can be applied to arbitrary embodiments of the present invention as long as no inconsistency arises.

In one modification, the learning device 10 constructs (generates) a trained model by using training data generated by the learning device 10, without using a pretrained natural language model, i.e., without performing fine tuning.

In one modification, the determining device 50 is configured to store a trained model generated by the learning device 10 in the storage device 54 and to perform inference processing and determination processing without carrying out communication.

In one modification, each card $card_i$ does not include "explanation" and includes only "name". Also in this modification, it is possible to learn semantic distance relationships between cards if it is possible to just convert cards themselves ("name") into words. In this case, for example, the encode function receives $State_i$ of the i-th item of game state data, and converts the received $State_i$ into controlled natural language data $State\_T_i$ expressed in a prescribed format, by using the individual "name"s of the cards in $State_i$ and the rule-based system.

The following describes modifications of the configuration of the training-data generating unit 22 in the case where the data weighting unit 21 has determined a weight $W_\beta$ for $Replaylog_\beta$ of the β-th replay-log element group in the case where Replaylogβ includes γ pairs of $State_k$ (k=1 to γ) and $Action_k$ (k=1 to γ). In one modification, the training-data generating unit 22 is configured to generate $N_k!$ Items of game-state explanation text as game-state explanation text corresponding to $State_k$ in the case where the number $N_k!$ of permutations of the items of game-state explanation text corresponding to $State_k$ is less than m. In one modification, the training-data generating unit 22 determines $m_k$ ($1 \le m_k \le N_k!$) corresponding to each $State_k$ on the basis of the value obtained by multiplying the number $N_k!$ of permutations of $N_k$ sentences included in the game-state explanation text corresponding to the state $State_k$, and generates $m_k$ items of game-state explanation text for each state $State_k$.

The processing or operation described above may be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

10 Learning device
11 Processor
12 Input device
13 Display device
14 Storage device
15 Communication device
16 Bus
21 Data weighting unit
22 Training-data generating unit
23 Learning unit
40 Game screen
41 Card
42 First card group
43 Game field
44 Second card group
45 Character
50 Determining device
51 Processor
52 Input device
53 Display device
54 Storage device
55 Communication device
56 Bus
61 Inference-data generating unit
62 Determining unit

The invention claimed is:

1. A method comprising:

determining a plurality of weights for a plurality of individual history-data element groups included in history data concerning a computer game based on user information associated with the plurality of individual history-data element groups;

generating game state text data and action text data based on the computer game, wherein the game state text data and the action text data are expressed in a prescribed format corresponding to a plurality of game states and a plurality of actions included in the plurality of individual history-data element groups included in the history data;

generating training data using the game state text data and the action text data, wherein the training data comprises a plurality of pairs of game state text and action text, and wherein a respective pair among the plurality of pairs corresponds to a single game state and an action selected in the single game state;

generating a trained transformer neural network using the training data and a pretrained natural language model, wherein the pretrained natural language model is configured in advance to understand a plurality of grammatical structures and a plurality of text-to-text relationships concerning a natural language, wherein the training data comprises a number of items of game state text, wherein the items of game state text have different orders of a plurality of text elements, and wherein the number of items of game state text is based on a weight among the plurality of weights that is determined for a history-data element group among the plurality of individual history-data element groups;

displaying, on a display device and by a user terminal device comprising an input device and a computer processor, a plurality of game screens for the computer game;

receiving, during the computer game and by the input device, a player input from a player that is operating the computer game in response to displaying at least one game screen among a plurality of game screens;

determining, by the user terminal device, a first game state within the computer game based on the player input and in response to receiving the player input from the input device;

determining, using the trained transformer neural network, a predicted user action in the computer game using the first game state as an input to the trained transformer neural network;

determining, by the user terminal device, a second game state within the computer game using the predicted user action; and executing, by the user terminal device, the computer game based on the second game state that is determined using the predicted user action.

2. The method according to claim 1, wherein the trained transformer neural network is generated by training a deep learning model with the training data, the deep learning model being directed to learning sequential data.

3. The method according to claim 1, wherein the plurality of weights are determined so as to have a plurality of magnitudes corresponding to a plurality of levels of user ranks included in the user information.

4. The method according to claim 1, wherein:

generating the training data includes generating first pairs of training data and second pairs of training data, the first pairs of training data being pairs of game state text and action text corresponding to pairs of one game state and an action selected in the one game state, generated based on data of game states and actions included in the plurality of individual history-data element groups included in the history data, and the second pairs of training data being pairs of game state text and action text corresponding to actions that are randomly selected from actions selectable by a user and that are not included in the first pairs; and generating the trained transformer neural network comprises performing training with the first pairs of training data as correct data and performing training with the second pairs of training data as incorrect data.

5. A non-transitory computer readable medium storing a program that causes a computer to execute the method according to claim 1.

6. The method according to claim 1, wherein the predicted user action is used by a game artificial intelligence (AI) within the computer game.

7. A system comprising:

a processor; and a memory connected to the processor, wherein the memory comprises a program configured to perform a method comprising:

determining a plurality of weights for a plurality of individual history-data element groups included in history data concerning a computer game based on user information associated with the plurality of individual history-data element groups;

generating game state text data and action text data based on the computer game, wherein the game state text data and the action text data are expressed in a prescribed format corresponding to a plurality of game states and a plurality of actions included in the plurality of individual history-data element groups included in the history data;

generating training data using the game state text data and the action text data, wherein the training data comprises a plurality of pairs of game state text and action text, and wherein a respective pair among the plurality of pairs corresponds to a single game state and an action selected in the single game state;

generating a trained transformer neural network using the training data and a pretrained natural language model, wherein the pretrained natural language model is configured in advance to understand a plurality of grammatical structures and a plurality of text-to-text relationships concerning a natural language, wherein the training data comprises a number of items of game state text, wherein the items of game state text have different orders of a plurality of text elements, and wherein the number of items of game state text is based on a weight among the plurality of weights that is determined for a history-data element group among the plurality of individual history-data element groups;

displaying, on a display device, a plurality of game screens for the computer game;

receiving, during the computer game and by an input device, a player input from a player that is operating the computer game in response to displaying at least one game screen among a plurality of game screens;

determining a first game state within the computer game based on the player input and in response to receiving the player input from the input device;

determining, using the trained transformer neural network, a predicted user action in the computer game using the first game state as an input to the trained transformer neural network;

determining a second game state within the computer game using the predicted user action; and executing the computer game based on the second game state that is determined using the predicted user action.

* * * * *